United States Patent
Kitamura

(10) Patent No.: US 10,404,652 B2
(45) Date of Patent: Sep. 3, 2019

(54) COMMUNICATION DEVICE, COMMUNICATION METHOD, AND PROGRAM

(71) Applicant: NEC Corporation, Tokyo (JP)

(72) Inventor: Hiroshi Kitamura, Tokyo (JP)

(73) Assignee: NEC Corporation, Tokyo (JP)

( * ) Notice: Subject to any disclaimer, the term of this patent is extended or adjusted under 35 U.S.C. 154(b) by 126 days.

(21) Appl. No.: 14/905,120

(22) PCT Filed: May 27, 2014

(86) PCT No.: PCT/JP2014/063973
§ 371 (c)(1),
(2) Date: Jan. 14, 2016

(87) PCT Pub. No.: WO2015/008541
PCT Pub. Date: Jan. 22, 2015

(65) Prior Publication Data
US 2016/0182443 A1   Jun. 23, 2016

(30) Foreign Application Priority Data

Jul. 16, 2013 (JP) .................................. 2013-147288

(51) Int. Cl.
*H04L 29/12* (2006.01)
*H04L 12/721* (2013.01)
*H04L 12/755* (2013.01)

(52) U.S. Cl.
CPC ........ *H04L 61/2038* (2013.01); *H04L 45/021* (2013.01); *H04L 45/66* (2013.01);
(Continued)

(58) Field of Classification Search
CPC ... H04L 12/189; H04L 67/26; H04L 61/1511; H04L 61/6059; H04L 67/24
See application file for complete search history.

(56) References Cited

U.S. PATENT DOCUMENTS 7,187,648 B1 * 3/2007 Rangarajan ............. H04L 45/00
  370/216
2005/0265360 A1 * 12/2005 Kim ..................... H04L 12/2854
  370/400

(Continued)

FOREIGN PATENT DOCUMENTS

JP        2003-348116 A    12/2003

OTHER PUBLICATIONS

International Search Report corresponding to PCT/JP2014/063973, dated Jun. 24, 2014 (3 pages).

(Continued)

*Primary Examiner* — Scott B Christensen
(74) *Attorney, Agent, or Firm* — Wilmer Cutler Pickering Hale and Dorr LLP

(57) ABSTRACT

A communication device (10) having at least one interface used in communication including a default router in a path includes: an ID determination unit (110) that determines whether or not a Zone ID is assigned to a communication request including a link local address of Internet Protocol version 6 (IPv6) as a destination address; and an ID supplementing unit (120) that, when it is determined that the Zone ID is not assigned, acquires an interface ID for identifying the interface as a default interface ID and adds the acquired default interface ID as the Zone ID of the communication request.

19 Claims, 15 Drawing Sheets

(52) U.S. Cl.
CPC ...... *H04L 61/2092* (2013.01); *H04L 61/6004* (2013.01); *H04L 61/6059* (2013.01)

(56) References Cited

U.S. PATENT DOCUMENTS

| | | | | |
|---|---|---|---|---|
| 2006/0280192 | A1* | 12/2006 | Desanti | H04L 12/18 370/409 |
| 2008/0165783 | A1* | 7/2008 | Desanti | H04L 63/06 370/392 |
| 2008/0183893 | A1* | 7/2008 | Boden | H04L 29/12018 709/245 |
| 2012/0110207 | A1* | 5/2012 | Jennings | H04L 61/6004 709/245 |
| 2013/0003600 | A1* | 1/2013 | Jennings | H04L 61/6059 370/254 |
| 2014/0181279 | A1* | 6/2014 | Louis | H04W 12/02 709/222 |

OTHER PUBLICATIONS

H. Kitamura, et al., Free from Using Zone Identifier for IPv6 Link-Local Address, Network Working Group Internet-Draft, Jul. 10, 2013, pp. 1-11.

S. Deering, et al., "IPv6 Scoped Address Architecture," RFC4007, Mar. 2005, pp. 1-23.

W. Stevens, et al., "Advanced Sockets Application Program Interface (API) for IPv6," RFC3542, May 2003, pp. 1-77.

B. Carpenter, et al., "Representing IPv6 Zone Identifiers in Address Literals and Uniform Resource Identifiers," RFC6874, Feb. 2013, pp. 1-10.

\* cited by examiner

| DEFAULT INTERFACE ID | ORDER OF PRIORITY |
|---|---|
| IF001 | 3 |
| IF002 | 1 |
| IF003 | 2 |

FIG. 14
130

| DEFAULT INTERFACE ID | ORDER OF PRIORITY | STATE |
|---|---|---|
| IF001 | 3 | VALID |
| IF002 | 1 | INVALID |
| IF003 | 2 | VALID |

COMMUNICATION DEVICE, COMMUNICATION METHOD, AND PROGRAM

CROSS-REFERENCE TO RELATED APPLICATIONS

This application is a national stage application of International Application No. PCT/JP2014/063973 entitled "Communication Device, Communication Method, and Program," filed on May 27, 2014, which claims priority to Japanese Patent Application No. 2013-147288, filed on Jul. 16, 2013, the disclosures of each which are hereby incorporated by reference in their entirety.

TECHNICAL FIELD

The present invention relates to a communication device capable of performing communication using the Internet Protocol version 6 (IPv6) and a communication method and a program that are executed by the communication device.

BACKGROUND ART

Currently, IPv6 is supported in various terminals, such as personal computers or portable devices, and IPv6 packets flow across networks. In addition, only IPv6 addresses are acquired as new global addresses in the future. Accordingly, the use of IPv6 across networks is expected to be further rapidly increased.

As one of the addresses used in IPv6, there is the link local address. The scope of the link local address is limited to within the same broadcast segment (within the same link). In general, a communication device is provided with a plurality of interfaces, such as physically different interfaces including a cable interface and a wireless interface, and a virtual interface used in a virtual local area network (VLAN) or the like. In any interface, the prefix of the link local address is the same as that of another interface. Accordingly, it is not possible to uniquely specify the broadcast segment, to which each interface belongs, with only the link local address. FIG. 15 is a diagram for explaining communication using a link local address. In FIG. 15, two links are connected to a communication device (node X). However, in both the links, the prefix is "fe80::/64". Accordingly, since the communication device (node X) cannot distinguish the links from each other with only the link local address, it is not possible to determine which interface is to be used in order to communicate with a communication destination device.

Therefore, in the case of communication using a link local address, it is necessary to specify the interface used by the communication source device in the communication. In the specification (RFC4007) of the current IPv6, it is determined that the destination is specified by assigning the ID of the interface used in the communication to the link local address. In RFC4007 (Non-patent Document 1), the interface ID assigned to the link local address is expressed as "Zone ID". Hereinafter, in this specification, the interface ID assigned to the link local address is expressed as "Zone ID". In addition, in RFC3542 (Non-patent Document 2), how the Zone ID is transmitted as an argument of a library is defined. In RFC6874 (Non-patent Document 3), how to deal with problems that may occur when the Zone ID is included in the uniform resource identifier (URI) is described.

In addition, the following Patent Document 1 discloses that, when a network device is connected to the IPv6 network, a home gateway (HGW) builds a home IPv6 network by automatically generating a link local address using an interface ID (Zone ID) set in the network device in advance.

RELATED DOCUMENT

Patent Document

[Patent Document 1] Japanese Unexamined Patent Publication No. 2003-348116

Non-Patent Document

[Non-patent Document 1] S. Deering, B. Haberman, T. Jinmei, E. Nordmark and B. Zill, "IPv6 Scoped Address Architecture", RFC4007, March, 2005

[Non-patent Document 2] W. Stevens, M. Thomas, E. Nordmark and T. Jinmei, "Advanced Sockets Application Program Interface (API) for IPv6", RFC3542, May, 2003

[Non-patent Document 3] B. Carpenter, S. Cheshire and R. Hinden, "Representing IPv6 Zone Identifiers in Address Literals and Uniform Resource Identifiers", RFC6874, February, 2013

SUMMARY OF THE INVENTION

In the case of communication using a link local address, it is necessary to assign a Zone ID to the link local address as described above. In some cases, the user has to manually input the Zone ID. For example, when a Ping6 command is used on the command line, the user needs to specify "link local address %<ZoneID>" as an argument. However, it is rare for the user to be fully aware of the interface ID of the interface provided in the terminal. In addition, when the user possesses a plurality of terminals, the interface ID of the interface may change depending on the terminal used by the user. For example, when a terminal includes an interface for cable communication and an interface for wireless communication, interface IDs are different in communication using the interface for cable communication and communication using the interface for wireless communication. That is, even in the same terminal, the Zone ID is not necessarily permanently the same. Therefore, the user always has to take into consideration which Zone ID is to be used (which interface is to be used) in communication using the link local address.

The present invention has been made in view of the problem described above, and it is an object of the present invention to provide a communication device, a communication method, and a program that enable communication using the link local address of IPv6 without the user being aware of the Zone ID.

A first aspect of the present invention relates to a communication device. A communication device according to a first aspect is a communication device having at least one interface used in communication including a default router in a path, and includes: an ID determination unit that determines whether or not a Zone ID is assigned to a communication request including a link local address of Internet Protocol version 6 (IPv6) as a destination address; and an ID supplementing unit that, when it is determined that the Zone ID is not assigned, acquires an interface ID for identifying the interface as a default interface ID and adds the acquired default interface ID as the Zone ID of the communication request.

A second aspect of the present invention relates to a communication method. A communication method according to a second aspect includes steps performed by a communication device having at least one interface, which is used in communication including a default router in a path, the steps including: an ID determination step of determining whether or not a Zone ID is assigned to a communication request including a link local address of Internet Protocol version 6 (IPv6) as a destination address; and an ID supplement step of acquiring the communication device acquires an interface ID for identifying the interface as a default interface ID and adding the acquired default interface ID as the Zone ID of the communication request when it is determined that the Zone ID is not assigned.

In addition, as another aspect of the present invention, a program causing at least one computer to achieve the configuration of each aspect described above may be provided, or a computer-readable recording medium in which such a program is recorded may be provided. The recording medium includes a non-transitory tangible medium.

According to the present invention, it is possible to perform communication using the link local address of IPv6 without the user being aware of the Zone ID.

BRIEF DESCRIPTION OF THE DRAWINGS

The above-described object and other objects, features, and advantages will become more apparent by preferred exemplary embodiments described below and the following accompanying diagrams.

FIG. 10 is a diagram showing an example of information stored in a storage unit in the second exemplary embodiment.

FIG. 14 is a diagram showing an example of information stored in a storage unit in the third exemplary embodiment.

DESCRIPTION OF EXEMPLARY EMBODIMENTS

Figure 1:
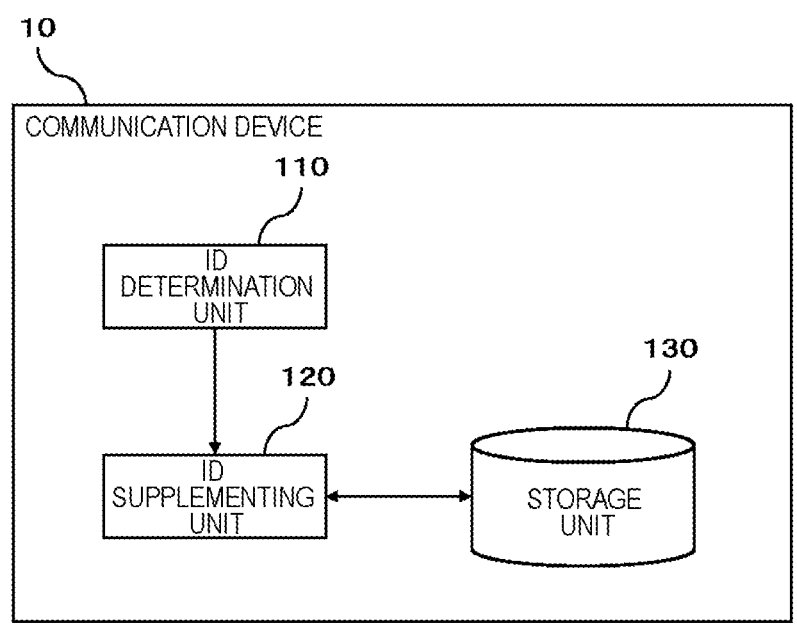
FIG. 1 is a block diagram showing a process configuration example of a communication device in a first exemplary embodiment.

Hereinafter, an exemplary embodiment of the present invention will be described with reference to the accompanying diagrams. In addition, the same components are denoted by the same reference numerals in all diagrams, and the explanation thereof will not be repeated.

First Exemplary Embodiment

A communication device in a first exemplary embodiment has at least one interface, which is used by the communication device in communication including a default router in a path. Hereinafter, this interface expressed as a "default interface". In addition, an interface ID indicating the default interface is expressed as a "default interface ID".

Each interface provided in the communication device may be a physical interface or may be a virtual interface, or may be a combination thereof. The "physical interface" referred to herein is, for example, a network interface card (NIC), such as a cable LAN card or a wireless LAN card provided in the communication device. The "virtual interface" referred to herein is, for example, an interface that is prepared to be handled similarly to physical interfaces in appearance in order to achieve the functions of a virtual private network (VPN), a VLAN, and the like.

[Process Configuration]

FIG. 1 is a block diagram showing a process configuration example of a communication device 10 in the first exemplary embodiment. In FIG. 1, the communication device 10 includes an ID determination unit 110, an ID supplementing unit 120, and a storage unit 130.

The ID determination unit 110 determines whether or not a Zone ID is assigned for a communication request including the link local address of IPv6 as a destination address. Specifically, the ID determination unit 110 determines whether or not "link local address %<ZoneID>" is included in the communication request.

The ID supplementing unit 120 adds a Zone ID to a communication request in which no Zone ID is assigned. Specifically, when the ID determination unit 110 determines that no Zone ID is assigned, the ID supplementing unit 120 acquires an interface ID for identifying the interface used in communication including the default router in the path, as a default interface ID, and adds the acquired default interface ID as a Zone ID of the communication request.

In the present exemplary embodiment, the default interface ID is stored in the storage unit 130. In the present exemplary embodiment, the ID supplementing unit 120 reads a default interface ID stored in the storage unit 130, and adds the read default interface ID, as a Zone ID, to the communication request for which it has been determined that no Zone ID has been assigned. The default interface ID added to the communication request can also be referred to as "Default Zone ID".

Figure 2:
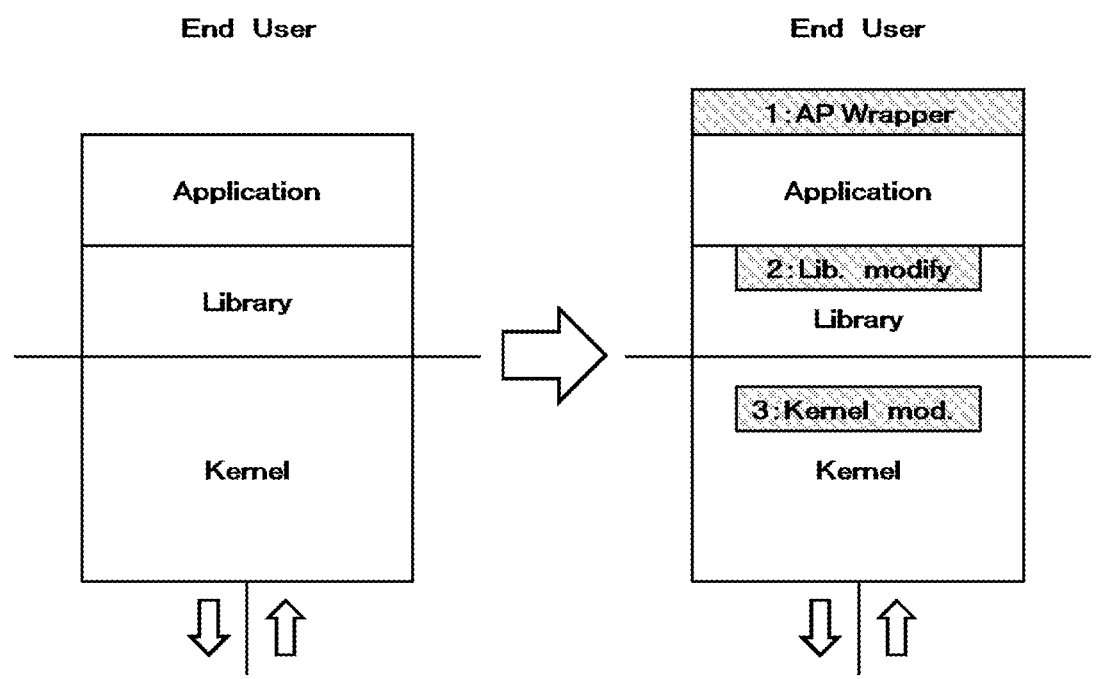
FIG. 2 is a diagram schematically showing a location where an ID supplementing unit is implemented.

FIG. 2 is a diagram schematically showing a location where the ID supplementing unit 120 is implemented. As shown in FIG. 2, as the location of the Zone ID implemented by the ID supplementing unit 120, "Application", "Library", and "Kernel" can be considered. The ID supplementing unit 120 is implemented in at least one of the Application, Library, and Kernel, and is needed to only add the Zone ID.

Each of "AP Wrapper", "Lib. modify", and "Kernel mod." shown in FIG. 2 corresponds to the ID supplementing unit 120.

In the case of adding the Zone ID using an application, for example, preparing Application Wrapper (AP Wrapper), in which a script to add the Zone ID is described, for each Application can be considered. Such a method is advantageous in that implementation is simple and the modification of the current Application is not necessary. On the other hand, it is necessary to support different argument specifications for each application.

In the case of adding the Zone ID using a library, for example, a method of modifying the application programming interface (API), in which the Zone ID should be specified as an argument in the socket library, can be considered. Specifically, if the Zone ID is not specified as an argument when calling the API, the API adds the Default Zone ID. In such a method, it is not necessary to support different argument specifications for each application. On the other hand, the API should be called from the application as desired by a library to be modified.

In the case of adding the Zone ID using a kernel, for example, when the communication request reaches the kernel without a Zone ID being added in both the application and the library, a method may be considered of modifying the kernel so that the Zone ID is added using the kernel. In this method, since most applications pass through the kernel, it is not necessary to be concerned about how a call is made unlike in the case of the library. On the other hand, kernel implementation requires more time than the other two methods.

In view of the above, the Library is preferable as a location where the ID supplementing unit 120 is implemented. However, depending on the specifications or the like, application or kernel may also be selected.

Each component of the communication device 10 shown in FIG. 1 shows a block of a functional unit instead of the configuration of a hardware unit. Each component of the communication device 10 is achieved by any combination of hardware and software based on a CPU of any communication device, a memory, a program for achieving the components of this diagram that is loaded into the memory, a storage medium such as a hard disk for storing the program, and an interface for network connection. In addition, there are various modifications in the implementation method and the device.

[Hardware Configuration]

Figure 3:
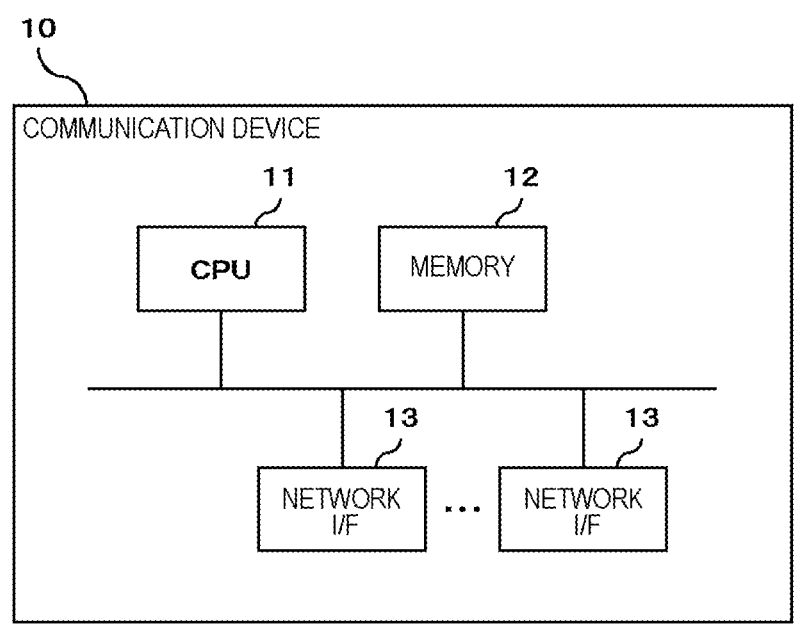
FIG. 3 is a block diagram showing an example of the hardware configuration of the communication device in the first exemplary embodiment.

FIG. 3 is a block diagram showing an example of the hardware configuration of the communication device 10 in the first exemplary embodiment. In FIG. 3, the communication device 10 includes a central processing unit (CPU) 11, a memory 12, and a network interface (I/F) 13, and the like that are connected to each other through a bus. The memory 12 is a random access memory (RAM), a read only memory (ROM), a hard disk, a portable storage medium, or the like. In FIG. 3, the communication device 10 includes a plurality of network I/Fs 13. FIG. 3 is an example, and the hardware configuration of the communication device 10 is not limited to FIG. 3. For example, only one network I/F 13 may be provided. For example, the communication device 10 may further include an input and output I/F connected to a display device, such as a display, and an input device, such as a keyboard.

Each processing unit of the communication device 10 described previously is, achieved, for example, by the execution of a program stored in the memory 12 by the CPU 11. For example, the program may be installed through the input and output I/F from a portable recording medium, such as a compact disc (CD) or a memory card, or other computers on the network, and may be stored in the memory 12.

Operation Example

Figure 4:
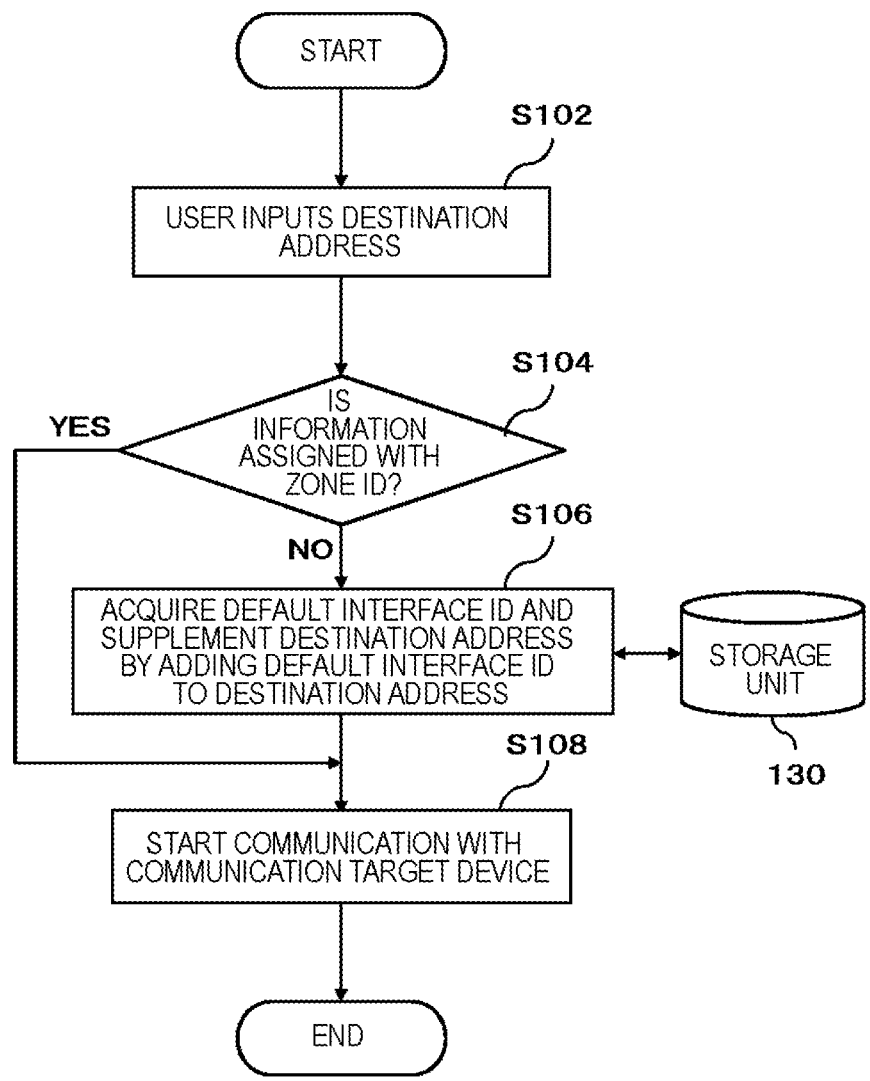
FIG. 4 is a flowchart showing the flow of the process of the communication device in the first exemplary embodiment.
Figure 5:
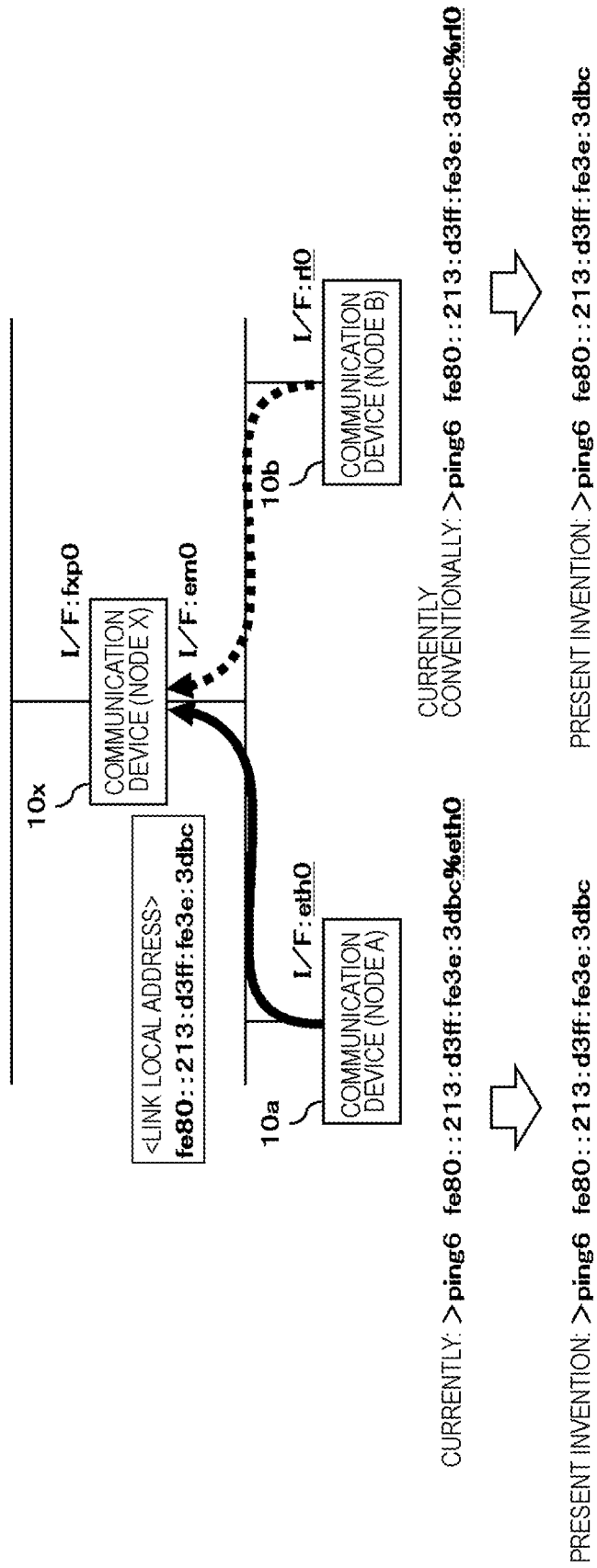
FIG. 5 is a diagram for explaining one of the effects of the first exemplary embodiment.

The flow of the process of the communication device 10 in the present exemplary embodiment will be described with reference to FIG. 4. FIG. 4 is a flowchart showing the flow of the process of the communication device 10 in the first exemplary embodiment.

The communication device 10 generates a communication request including the link local address as a destination address (S102). For example, this communication request is generated according to the operation of the user, such as inputting a destination address, in an application that performs communication with other devices. Then, the communication device 10 determines whether or not the Zone ID is assigned to the communication request generated in S102 (S104). When the Zone ID is assigned to the communication request (S104: YES), the communication device 10 communicates with a communication target device using the communication request generated in S102 as it is. On the other hand, when no Zone ID is assigned to the communication request (S104: NO), the communication device 10 acquires a default interface ID from the storage unit 130, and adds the default interface ID to the communication request (S106). Then, the communication device 10 communicates with the communication target device using the communication request assigned with the Zone ID (S108).

[Operations and Effects]

As described above, in the present exemplary embodiment, when no Zone ID is assigned to the link local address included in the communication request, a default interface ID indicating the interface that is used by the communication device 10 in communication including the default router in the path is assigned as the Zone ID. The present inventors have introduced a new concept of an interface used by the communication device 10 in communication including the default router in the path, that is, a default interface, as an interface having an interface ID to be added as a Zone ID. This follows the concept of the default route, and is based on the fact that the probability that the communication device at the destination will be present in the link, to which the default interface belongs, is generally high.

Therefore, according to the present exemplary embodiment, the user can perform communication using a link local address without being aware of the Zone ID by knowing only the link local address.

In addition, according to the present exemplary embodiment, since the user does not need to input the Zone ID, an unexpected character, such as "%" of "%<ZoneID>", is not included in the argument when calling a certain function. Therefore, it is possible to prevent the occurrence of an unexpected problem in the application including the function.

In addition, according to the present exemplary embodiment, the user does not need to input node local information, which is the "Zone ID", that is different for each communication device 10 (node). More specifically, since the Zone ID is added in internal processing, the user does not need to specify "%<ZoneID>" apparently as an argument of the command. Therefore, information to be specified when communicating with a node at a certain destination using the link local address is unified. One of the effects of the present exemplary embodiment will be specifically described by way of example of a Ping6 command with reference to FIG.

5. Here, a case of transmitting the Ping6 command to a communication device 10x (node X) will be described as an example. In such a case, in the conventional technique, the user needs to specify different arguments in the Ping6 command for a communication device 10a (node A) and a communication device 10b (node B) even though the destination of the Ping6 command is the same. On the other hand, according to the present exemplary embodiment, for both the communication device 10a (node A) and the communication device 10b (node B), the user can communicate with the communication device 10x (node X) just by specifying the link local address of the communication device 10x (node X).

In addition, according to the present exemplary embodiment, since the Zone ID is information that is not visible to the user, the link local address that is the link local information and the Zone ID that is the node local information can be separated from each other. Therefore, since it is not necessary to manage the Zone ID, which is the node local information, in the services such as a domain name system (DNS), it becomes clear how to handle the link local address. In addition, how to handle the Zone ID due to the handling of the hostname corresponding to the link local address has been a problem in the same way. However, according to the present exemplary embodiment, this problem is also solved.

Modification Example of the First Exemplary Embodiment

Figure 6:
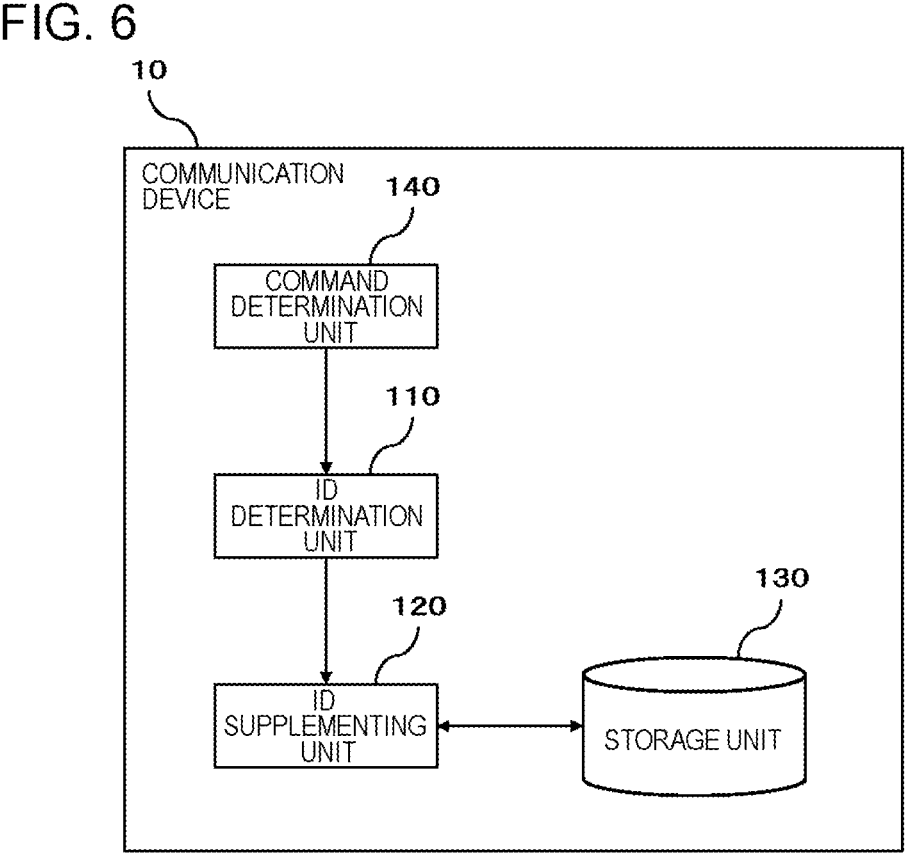
FIG. 6 is a block diagram showing a process configuration example of a communication device in a modification example of the first exemplary embodiment.

As shown in FIG. 6, the communication device 10 may further include a command determination unit 140. FIG. 6 is a block diagram showing a process configuration example of the communication device 10 in a modification example of the first exemplary embodiment. The command determination unit 140 determines whether or not the destination address included in the communication request is a link local address. Specifically, the command determination unit 140 determines whether or not the destination address is a link local address according to whether or not the prefix of the destination address is "fe80::/64". Then, only when the command determination unit 140 determines that the destination address is a link local address, the ID determination unit 110 and ID supplementing unit 120 perform the processing described above. Accordingly, even when the communication device 10 can perform communication using other types of addresses (global address or the like) other than the link local address, the communication device 10 can appropriately determine whether or not it is necessary to add a Zone ID.

In the present exemplary embodiment, an example has been shown in which the communication device 10 includes the storage unit 130 and acquires the default interface ID from the storage unit 130 and adds the default interface ID as a Zone ID. However, the communication device 10 can also acquire the default interface ID from the routing table. Specifically, the communication device 10 can use the interface ID in the default route entry stored in the routing table as a default interface ID. In this case, the communication device 10 may not include the storage unit 130.

Figure 7:
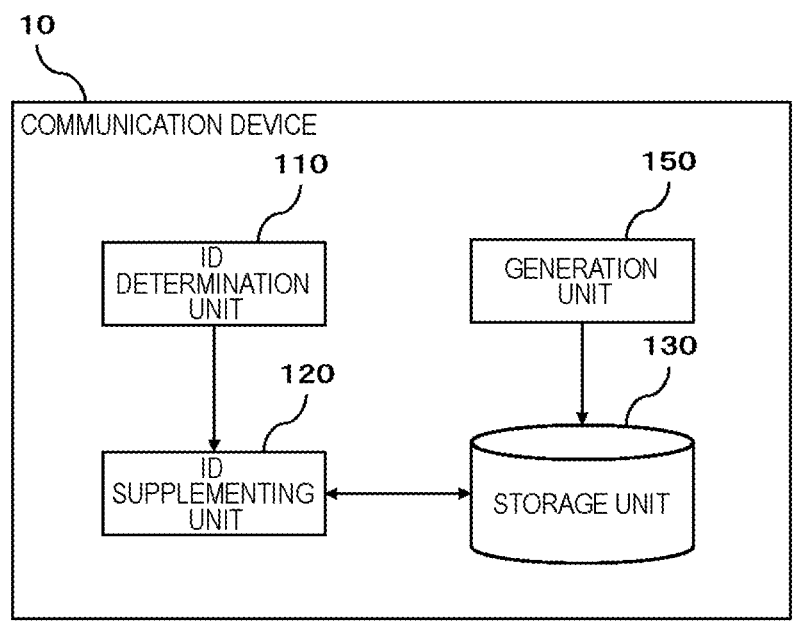
FIG. 7 is a block diagram showing a process configuration example of a communication device in a modification example of the first exemplary embodiment.

The communication device 10 may further include a generation unit 150, as shown in FIG. 7. FIG. 7 is a block diagram showing a process configuration example of the communication device 10 in a modification example of the first exemplary embodiment. The generation unit 150 generates the storage unit 130 based on the default route entry stored in the routing table of the communication device 10. Specifically, the generation unit 150 acquires the interface ID included in the default route entry stored in the routing table of the communication device 10. Then, the generation unit 150 stores the acquired interface ID in the storage unit 130 as a default interface ID. Then, as described above, the ID supplementing unit 120 adds the Zone ID using the default interface ID stored in the storage unit 130.

Figure 8:
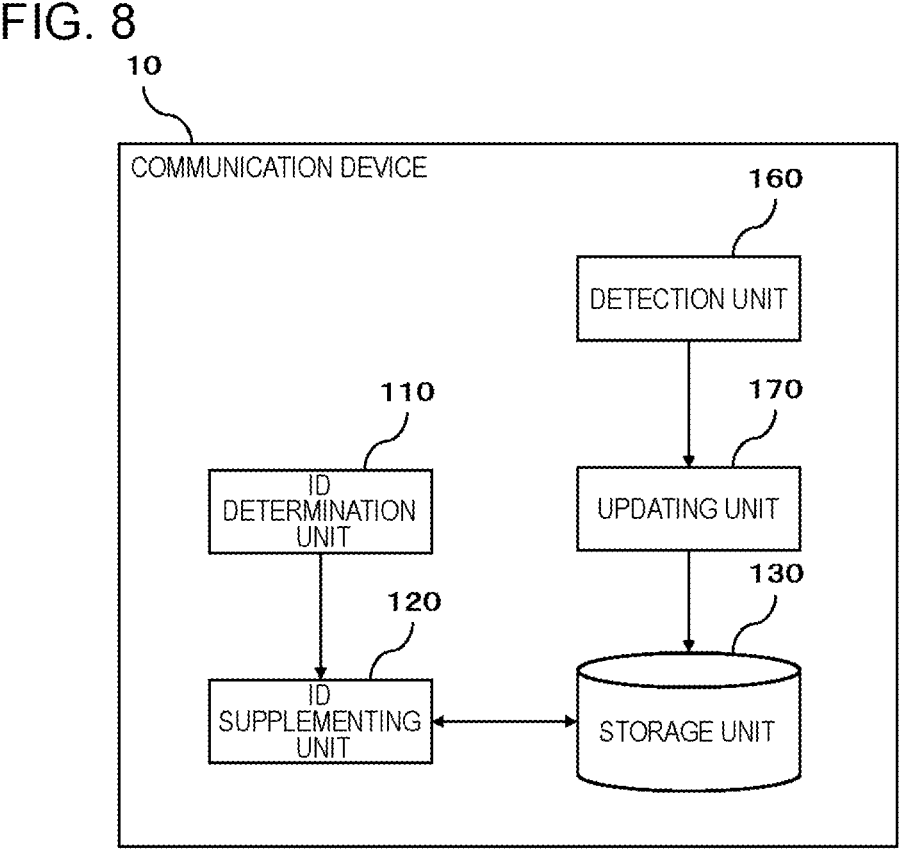
FIG. 8 is a block diagram showing a process configuration example of a communication device in a modification example of the first exemplary embodiment.

The information of the default router is not permanent information, and may change with the passage of time. For example, when the communication device 10 includes an interface for cable communication and an interface for wireless communication, the default router corresponding to the communication device 10 may also change depending on to which of the cable side and the wireless side the default router is directed. Therefore, as shown in FIG. 8, the communication device 10 may further include a detection unit 160 and an updating unit 170. FIG. 8 is a block diagram showing a process configuration example of the communication device 10 in a modification example of the first exemplary embodiment.

The detection unit 160 detects the setting change of the default router. The detection unit 160 may detect the setting change of the default router by monitoring the change in the setting information of the default router. In addition, the detection unit 160 may be achieved by hooking a part of the updating process of the default router. In this case, if the updating process of the default router is performed, the added hook processing is performed together with the updating process. Accordingly, the hook processing functions as the detection unit 160.

The updating unit 170 updates the content of the storage unit 130 according to the setting change of the default router. Specifically, when the setting change of the default router is detected, the updating unit 170 acquires the interface ID of the default interface corresponding to the default router after the change as a new default interface ID. Then, the updating unit 170 updates the storage unit 130 using the acquired default interface ID. The updating unit 170 may acquire the default interface ID from the default route entry of the routing table after the setting change, or may acquire the default interface ID in the hook processing described above.

In this manner, it is possible to manage the storage unit 130 according to the state of the current network. Therefore, it is possible to improve the reliability of communication using the link local address.

Second Exemplary Embodiment

In many cases, the number of default routers of the communication device 10 is one. However, since there is a communication device 10 in which cable communication and wireless communication can be used simultaneously, for example, a plurality of default routers may be present at the same time. Therefore, in the present exemplary embodiment, a configuration considering the case in which a plurality of default routers are present will be described. The present exemplary embodiment is the same as the first exemplary embodiment except for the following points.

[Process Configuration]

Figure 9:
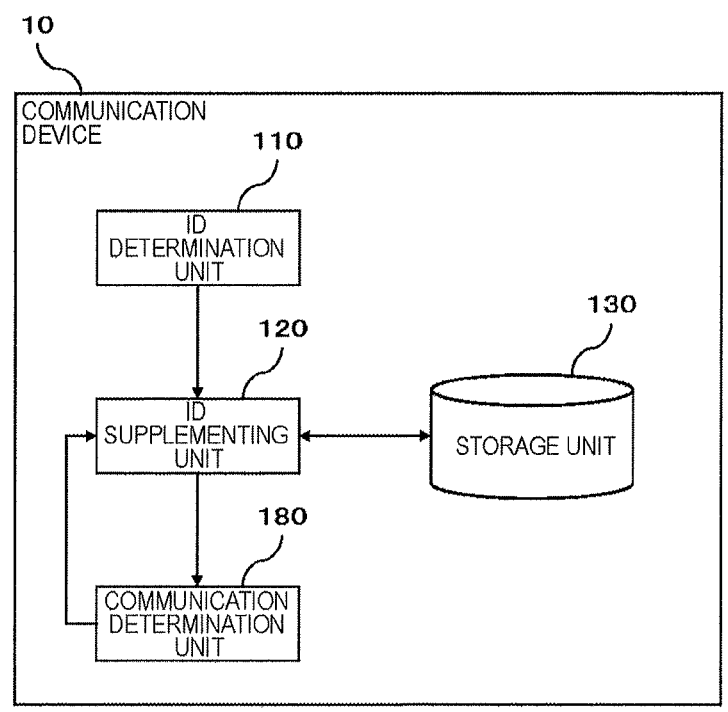
FIG. 9 is a block diagram showing a process configuration example of a communication device in a second exemplary embodiment.

FIG. 9 is a block diagram showing a process configuration example of a communication device 10 in the second exemplary embodiment. The communication device 10 of the present exemplary embodiment further includes a communication determination unit 180 that determines whether communication performed by the communication request has succeeded or failed.

The communication determination unit 180 notifies the ID supplementing unit 120 of the determination result of the success or failure of communication performed by the communication request. For example, in the case of communication using a protocol that replies, the communication determination unit 180 can determine that communication has failed when there is no response for a predetermined time.

When the communication determination unit 180 determines that communication performed by the communication request has failed, the ID supplementing unit 120 that has received the notification acquires an interface ID other than the default interface ID added in the communication, and newly adds the acquired interface ID as a Zone ID. In the present exemplary embodiment, a flow will be described in which the ID supplementing unit 120 reads an unused default interface ID of the plurality of default interface IDs stored in the storage unit 130 and newly adds the read unused default interface ID to the communication request as a new Zone ID. However, without being limited to this, when no unused default interface ID is present in the storage unit 130, the ID supplementing unit 120 can also acquire an interface ID corresponding to an interface other than the default interface of the communication device 10 and add the acquired interface ID to the communication request as a Zone ID.

In the present exemplary embodiment, the communication device 10 includes a plurality of default routers, and the storage unit 130 stores a plurality of default interface IDs corresponding to the plurality of default routers. An order of priority is assigned to each default interface ID stored in the storage unit 130. FIG. 10 is a diagram showing an example of information stored in the storage unit 130 in the second exemplary embodiment. As shown in FIG. 10, the order of priority is assigned to each default interface ID. The ID supplementing unit 120 selects a default interface ID, which is added as a Zone ID, according to the order of priority assigned in the storage unit 130. The order of priority of the default interface ID may be set according to Metric of the routing table, and or may be arbitrarily set by the user, for example.

Operation Example

Figure 11:
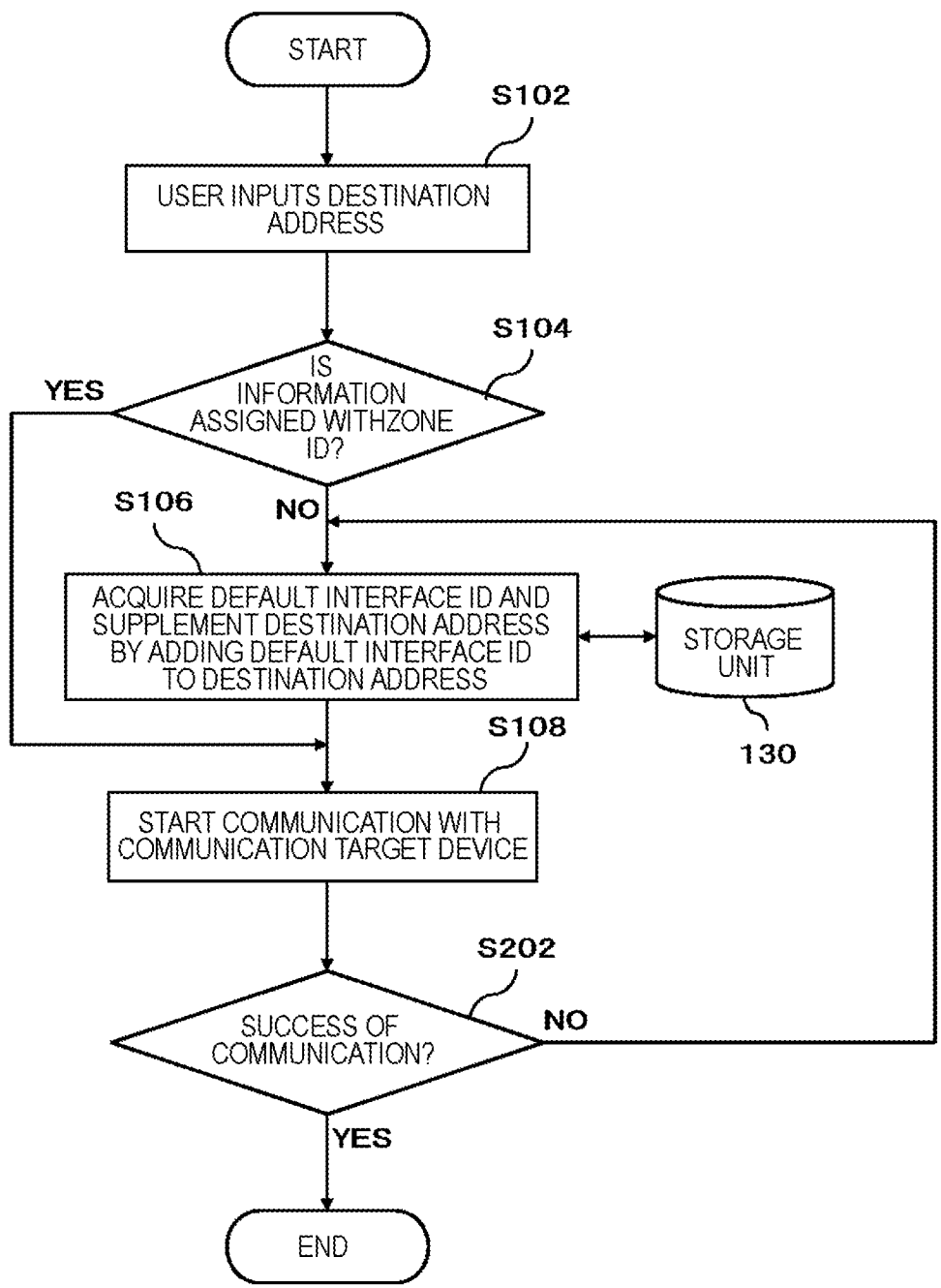
FIG. 11 is a flowchart showing the flow of the process of the communication device in the second exemplary embodiment.

The flow of the process of the communication device 10 in the present exemplary embodiment will be described with reference to FIG. 11. FIG. 11 is a flowchart showing the flow of the process of the communication device 10 in the second exemplary embodiment.

The communication device 10 determines whether or not communication has succeeded (S202). Here, the communication device 10 may determine whether communication has succeeded or failed by attempting communication only once, or may determine whether communication has succeeded or failed by attempting communication multiple times, for example, three times. When the communication has succeeded (S202: YES), the communication device 10 ends the process. On the other hand, when the communication has failed (S202: NO), the communication device 10 acquires an unused default interface ID from the storage unit 130, and assigns the acquired unused default interface ID to the communication request as a new Zone ID (S106). Here, the communication device 10 acquires a default interface ID having the highest priority next to the default interface ID used in previous communication. Then, the communication device 10 communicates again with the communication target using the communication request to which the new Zone ID is assigned (S108). Then, the communication device 10 repeats the process until communication succeeds or all of the default interface IDs are used.

[Operations and Effects]

As described above, according to the present exemplary embodiment, when a plurality of default interfaces are present, one default interface is selected according to the set order of priority. In addition, the default interface ID corresponding to the selected default interface is added to the communication request as a Zone ID.

Therefore, also in the present exemplary embodiment, it is possible to obtain the same effects as in the first exemplary embodiment.

In addition, in the present exemplary embodiment, when communication using a certain default interface ID as a Zone ID has failed, another default interface ID stored in the storage unit 130 is added to the communication request as a new Zone ID.

Therefore, according to the present exemplary embodiment, since communication is attempted using a plurality of default interfaces, it is possible to increase the probability of success in communication.

Third Exemplary Embodiment

The present exemplary embodiment is the same as the second exemplary embodiment except for the following points.

Figure 12:
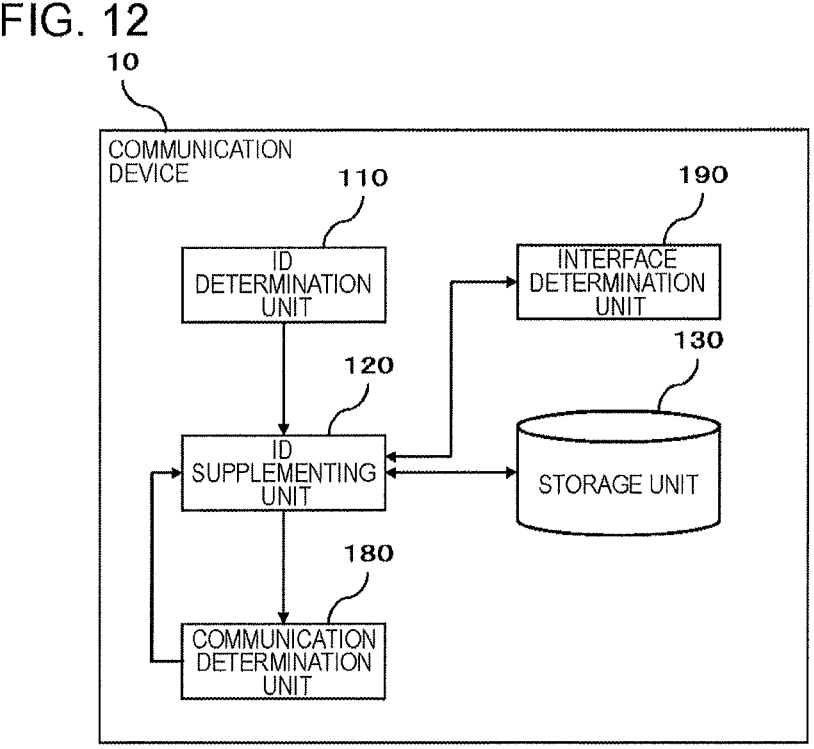
FIG. 12 is a block diagram showing a process configuration example of a communication device in a third exemplary embodiment.

FIG. 12 is a block diagram showing a process configuration example of a communication device 10 in a third embodiment. In the present embodiment, the communication device 10 further includes an interface determination unit 190.

The interface determination unit 190 determines whether or not each interface provided in the communication device 10 is valid. For example, when the interface is not in the UP state due to the cable being disconnected in cable communications or due to association with the access point being not yet completed in wireless communication, the interface determination unit 190 determines that the interface is invalid. In addition, for example, the interface determination unit 190 determines an interface, which is not in the ready state in the L2 layer or below, to be invalid. The interface determination unit 190 also determines an interface, which is not in the ready state in the L3 layer due to reasons such as no address being set, to be invalid. In addition, the interface determination unit 190 does not perform determination for a special interface, such as a loopback interface.

The ID supplementing unit 120 acquires the interface ID of the interface determined to be "valid" by the interface determination unit 190. Then, the ID supplementing unit 120 adds the acquired interface ID to the communication request as a Zone ID.

Operation Example

Figure 13:
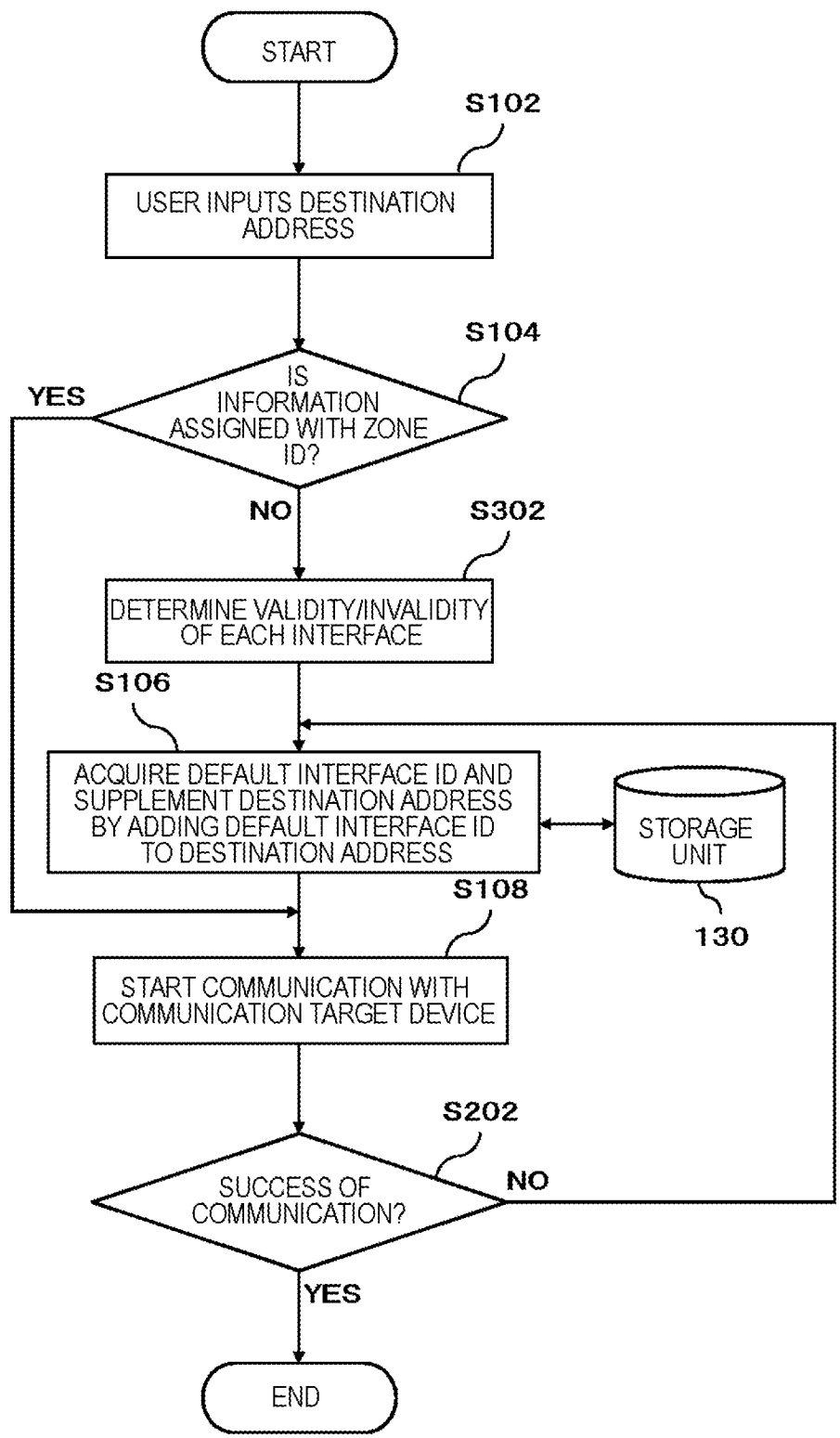
FIG. 13 is a flowchart showing the flow of the process of the communication device in the third exemplary embodiment.
Figure 15:
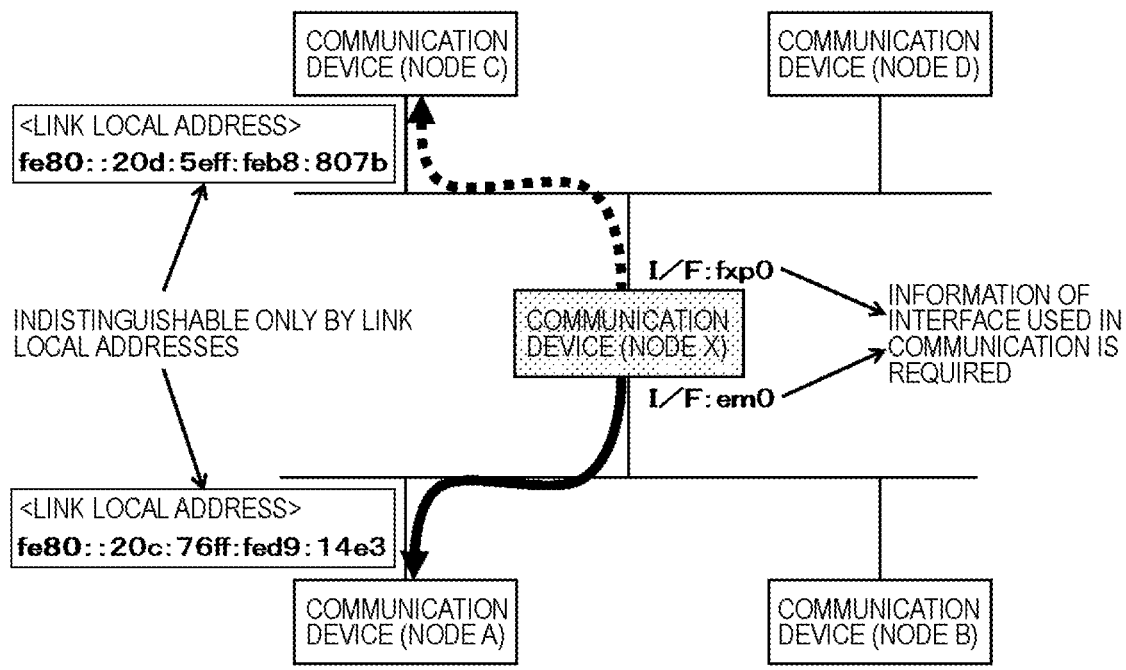
FIG. 15 is a diagram for explaining communication using a link local address.

The flow of the process of the communication device 10 in the present exemplary embodiment will be described with reference to FIG. 13. FIG. 13 is a flowchart showing the flow of the process of the communication device 10 in the third exemplary embodiment.

The communication device 10 determines validity/invalidity of each interface (S302). The communication device 10 manages the valid interface so as to be identifiable, for example, by giving a flag indicating the valid interface according to the determination result. In the present exemplary embodiment, as shown in FIG. 14, the determination result of validity/invalidity of each interface is stored in the storage unit 130. FIG. 14 is a diagram showing an example of information stored in the storage unit 130 in the third exemplary embodiment. The communication device 10 uses the determination result of validity/invalidity when assigning the Zone ID in S106. In the example shown in FIG. 14, a default interface ID corresponding to "IF003" having higher priority, between "IF001" and "IF003" that are "valid" interfaces, is acquired, and the acquired default interface ID is added to the communication request as a Zone ID (S106).

[Operations and Effects]

As described above, in the present exemplary embodiment, the validity/invalidity of each interface provided in the communication device 10 is determined. In addition, a default interface ID is acquired from the interfaces determined to be "valid", and the acquired default interface ID is added to the communication request as a Zone ID.

As described above, according to the present exemplary embodiment, since only the interface determined to be valid, that is, only an interface currently allowing communication is used, it is possible to improve processing efficiency by omitting useless communication processing.

In the present exemplary embodiment, an example has been described in which the interface determination unit 190 determines the validity/invalidity of the default interface and the ID supplementing unit 120 adds the interface ID of the default interface, which is determined to be valid, as a Zone ID. However, without being limited to this, the interface determination unit 190 may determine the validity/invalidity of interfaces other than the default interface. When all of the default interfaces are invalid, the ID supplementing unit 120 may add an interface ID of an interface determined to be valid, among interfaces other than the default interfaces, as a Zone ID.

While the exemplary embodiments of the present invention have been described with reference to the diagrams, these are only an illustration of the present invention, and other various configurations can also be adopted.

In a plurality of flowcharts used in the above explanation, a plurality of steps (processes) are described in order. However, the execution order of the processes performed in each exemplary embodiment is not limited to the order of the explanation. In each exemplary embodiment, it is possible to change the order of the illustrated steps in a range in which no problem is caused in terms of the content. In addition, the respective exemplary embodiments described above can be combined in a range in which the contents thereof do not conflict with each other.

Hereinafter, examples of reference forms are additionally described.

1. A communication device having at least one interface used in communication including a default router in a path, the communication device including:

an ID determination unit that determines whether or not a Zone ID is assigned to a communication request including a link local address of Internet Protocol version 6 (IPv6) as a destination address; and an ID supplementing unit that, when it is determined that the Zone ID is not assigned in the determination, acquires an interface ID for identifying the interface as a default interface ID and adds the acquired default interface ID as the Zone ID of the communication request.

2. The communication device according to 1 further including a command determination unit that determines whether or not the destination address included in the communication request is a link local address, in which the ID determination unit and the ID supplementing unit operate only when it is determined that the destination address is a link local address.

3. The communication device according to 1 or 2 in which the ID supplementing unit acquires an interface ID which is included in a default route entry stored in a routing table of the communication device as the default interface ID.

4. The communication device according to 1 or 2 which further includes a storage unit that stores the default interface ID, in which the ID supplementing unit acquires the default interface ID from the storage unit.

5. The communication device according to 4 further including a generation unit that acquires an interface ID which is included in a default route entry stored in a routing table of the communication device as the default interface ID, and stores the acquired default interface ID in the storage unit.

6. The communication device according to 4 or 5 in which a plurality of the default interface IDs assigned with an order of priority are stored in the storage unit, and the ID supplementing unit selects the default interface ID to be added as the Zone ID according to the order of priority.

7. The communication device according to any one of 4 to 6 further including:

a detection unit that detects a setting change of the default router; and an updating unit that updates the storage unit using an interface ID which indicates an interface used in communication including the default router after a change in a path when the setting change is detected.

8. The communication device according to any one of 1 to 7 further including a communication determination unit that determines whether communication performed by the communication request has succeeded or failed, in which, when it is determined that the communication has failed, the ID supplementing unit acquires an interface ID other than the default interface ID added in the communication and newly adds the acquired interface ID as the Zone ID.

9. The communication device according to any one of 1 to 8 further including an interface determination unit that determines whether or not each interface provided in the communication device is valid, in which the ID supplementing unit acquires an interface ID of the interface determined to be valid and adds the acquired interface ID as the Zone ID.

10. A communication method including steps performed by a communication device having at least one interface, which is used in communication including a default router in a path, the steps including:

an ID determination step of determining whether or not a Zone ID is assigned to a communication request including a link local address of Internet Protocol version 6 (IPv6) as a destination address; and an ID supplement step of acquiring, an interface ID for identifying the interface as a default interface ID and adding the acquired default interface ID as the Zone ID of the communication request when it is determined that the Zone ID is not assigned.

11. The communication method according to 10 further including a command determination step performed by the communication device of determining whether or not the destination address included in the communication request is a link local address, in which the ID determination step and the ID supplement step are performed only when it is determined that the destination address is a link local address.

12. The communication method according to 10 or 11 in which, in the ID supplement step, the communication device acquires an interface ID, which is included in a default route entry stored in a routing table of the communication device, as the default interface ID.

13. The communication method according to 10 or 11 in which, in the ID supplement step, the communication device acquires the default interface ID from a storage unit that stores the default interface ID.

14. The communication method according to 13 further including a generation step performed by the communication device of acquiring an interface ID which is included in a default route entry stored in a routing table of the communication device as the default interface ID, and storing the acquired default interface ID in the storage unit.

15. The communication method according to 13 or 14 in which a plurality of the default interface IDs assigned with an order of priority are stored in the storage unit, and in the ID supplement step, the communication device selects the default interface ID to be added as the Zone ID according to the order of priority.

16. The communication method according to any one of 13 to 15 further including steps performed by the communication device of:

a detection step of detecting a setting change of the default router; and an updating step of updating the storage unit using an interface ID, which indicates an interface used in communication including the default router after a change in a path, when the setting change is detected.

17. The communication method according to any one of 10 to 16 further including a communication determination step performed by the communication device of determining whether communication performed by the communication request has succeeded or failed, and when it is determined that the communication has failed, in the ID supplement step, the communication device acquires an interface ID other than the default interface ID added in the communication and adds the acquired interface ID again as the Zone ID.

18. The communication method according to any one of 10 to 17 further including an interface determination step performed by the communication device of determining whether or not each interface provided in the communication device is valid, and in the ID supplement step, the communication device acquires an interface ID of the interface determined to be valid, and adds the acquired interface ID as the Zone ID.

19. A program causing a computer having at least one interface used in communication including a default router in a path to function as:

an ID determination unit that determines whether or not a Zone ID is assigned to a communication request including a link local address of Internet Protocol version 6 (IPv6) as a destination address; and an ID supplementing unit that, when it is determined that the Zone ID is not assigned, acquires an interface ID for identifying the interface as a default interface ID and adds the acquired default interface ID as the Zone ID of the communication request.

20. The program according to 19 causing the computer to further function as a command determination unit that determines whether or not the destination address included in the communication request is a link local address, in which the ID determination unit and the ID supplementing unit are caused to operate only when it is determined that the destination address is a link local address.

21. The program according to 19 or 20 causing the computer to acquire an interface ID, which is included in a default route entry stored in a routing table of the communication device, as the default interface ID, using the ID supplementing unit.

22. The program according to 19 or 20 in which the computer includes a storage unit that stores the default interface ID, and the computer is caused to acquire the default interface ID from the storage unit using the ID supplementing unit.

23. The program according to 22 causing the computer to further function as a generation unit that acquires an interface ID which is included in a default route entry stored in a routing table of the communication device as the default interface ID, and stores the acquired default interface ID in the storage unit.

24. The program according to 22 or 23 in which a plurality of the default interface IDs assigned with an order of priority are stored in the storage unit, and the computer is caused to select the default interface ID to be added as the Zone ID according to the order of priority using the ID supplementing unit.

25. The program according to any one of 22 to 24 causing the computer to further function as:

a detection unit that detects a setting change of the default router; and an updating unit that updates the storage unit using an interface ID, which indicates an interface used in communication including the default router after a change in a path, when the setting change is detected.

26. The program according to any one of 19 to 25 causing the computer to further function as a communication determination unit that determines whether communication performed by the communication request has succeeded or failed, in which, when it is determined that the communication has failed, the computer is caused to acquire an interface ID other than the default interface ID added in the communication and newly add the acquired interface ID as the Zone ID using the ID supplementing unit.

27. The program according to any one of 19 to 26 causing the computer to further function as an interface determination unit that determines whether or not each interface provided in the computer is valid, in which the computer is caused to acquire an interface ID of the interface determined to be valid and add the acquired interface ID as the Zone ID using the ID supplementing unit.

This application claims priority from Japanese Patent Application No. 2013-147288, filed on Jul. 16, 2013, the entire contents of which are incorporated herein.

The invention claimed is:

1. A user device having at least one interface used in communication including a default router in a path, the user device comprising:

a receiving unit that receives command instructions, the command instructions being input by a user of the user device, the command instructions including a command for communication with a communication device and a link local address of Internet Protocol version 6 (IPv6) of the communication device;

an ID determination unit that determines whether or not a Zone ID is assigned to the link local address;

an ID supplementing unit that, when it is determined that the Zone ID is not assigned, acquires an interface ID for identifying the interface of the default router as a default interface ID and adds the acquired default interface ID to the link local address; and
a communication processing unit that communicates with the communication device based on the link local address to which the acquired default interface ID is added.

2. The user device according to claim 1, further comprising
a command determination unit that determines whether or not an address included in the command instructions is a link local address,
wherein the ID determination unit and the ID supplementing unit operate only when it is determined that the address included in the command instructions is a link local address.

3. The user device according to claim 1,
wherein the ID supplementing unit acquires an interface ID, which is included in a default route entry stored in a routing table of the user device, as the default interface ID.

4. The user device according to claim 1, further comprising
a storage unit that stores the default interface ID,
wherein the ID supplementing unit acquires the default interface ID from the storage unit.

5. The user device according to claim 4, further comprising
a generation unit that acquires an interface ID which is included in a default route entry stored in a routing table of the user device as the default interface ID, and stores the acquired default interface ID in the storage unit.

6. The user device according to claim 4,
wherein a plurality of the default interface IDs assigned with an order of priority are stored in the storage unit, and
the ID supplementing unit selects the default interface ID to be added as the Zone ID according to the order of priority.

7. The user device according to claim 4, further comprising:
a detection unit that detects a setting change of the default router; and
an updating unit that updates the storage unit using an interface ID, which indicates an interface used in communication including the default router after a change in a path, when the setting change is detected.

8. The user device according to claim 1, further comprising
a communication determination unit that determines whether communication performed by the command has succeeded or failed,
wherein, when it is determined that the communication has failed, the ID supplementing unit acquires an interface ID other than the default interface ID added in the communication and newly adds the acquired interface ID as the Zone ID.

9. The user device according to claim 1, further comprising
an interface determination unit that determines whether or not each interface provided in the user device is valid,
wherein the ID supplementing unit acquires an interface ID of the interface determined to be valid, and adds the acquired interface ID as the Zone ID.

10. A communication method, comprising steps performed by a user device having at least one interface which is used in communication including a default router in a path, the steps comprising:
a receiving step of receiving command instructions input by a user of the user device, the command instructions including a command for communication with a communication device and a link local address of Internet Protocol version 6 (IPv6) of the communication device;
an ID determination step of determining whether or not a Zone ID is assigned to the link local address;
an ID supplement step of acquiring an interface ID for identifying the interface of the default router as a default interface ID and adding the acquired default interface ID to the link local address when it is determined that the Zone ID is not assigned; and
a communication processing step of communicating with the communication device based on the link local address to which the acquired default interface ID is added.

11. The communication method according to claim 10, further comprising
a command determination step performed by the user device of determining whether or not an address included in the command instructions is a link local address,
wherein the ID determination step and the ID supplement step are performed only when it is determined that the address included in the command instructions is a link local address.

12. The communication method according to claim 10,
wherein, in the ID supplement step, the user device acquires an interface ID, which is included in a default route entry stored in a routing table of the user device, as the default interface ID.

13. The communication method according to claim 10,
wherein, in the ID supplement step, the user device acquires the default interface ID from a storage unit that stores the default interface ID.

14. The communication method according to claim 13, further comprising
a generation step performed by the user device of acquiring an interface ID which is included in a default route entry stored in a routing table of the user device as the default interface ID, and storing the acquired default interface ID in the storage unit.

15. The communication method according to claim 13,
wherein a plurality of the default interface IDs assigned with an order of priority are stored in the storage unit, and
in the ID supplement step, the user device selects the default interface ID to be added as the Zone ID according to the order of priority.

16. The communication method according to claim 13, further comprising steps performed by the user device of:
a detection step of detecting a setting change of the default router; and
an updating step of updating the storage unit using an interface ID, which indicates an interface used in communication including the default router after a change in a path, when the setting change is detected.

17. The communication method according to claim 10, further comprising
a communication determination step performed by the user device of determining whether communication performed by the command has succeeded or failed, wherein, when it is determined that the communication has failed, the ID supplement step comprises acquiring an interface ID other than the default interface ID added in the communication and newly adds the acquired interface ID as the Zone ID.

18. The communication method according to claim 10, further comprising an interface determination step performed by the user device of determining whether or not each interface provided in the user device is valid, wherein the ID supplement step comprises acquiring an interface ID of the interface determined to be valid, and adds the acquired interface ID as the Zone ID.

19. A non-transitory computer readable medium that stores a program causing a computer having at least one interface used in communication including a default router in a path to function as:

a receiving unit that receives command instructions, the command instructions being input by a user, the command instructions including a command for communication with a communication device and a link local address of Internet Protocol version 6 (IPv6) of the communication device;

an ID determination unit that determines whether or not a Zone ID is assigned to the link local address;

an ID supplementing unit that, when it is determined that the Zone ID is not assigned, acquires an interface ID for identifying the interface of the default router as a default interface ID and adds the acquired default interface ID to the link local address; and a communication processing unit that communicates with the communication device based on the link local address to which the acquired default interface ID is added.

* * * * *